United States Patent [19]
DeLong

[11] Patent Number: 6,141,344
[45] Date of Patent: Oct. 31, 2000

[54] COHERENCE MECHANISM FOR DISTRIBUTED ADDRESS CACHE IN A NETWORK SWITCH

[75] Inventor: Kenneth J. DeLong, Hollis, N.H.

[73] Assignee: 3Com Corporation, Santa Clara, Calif.

[21] Appl. No.: 09/044,293

[22] Filed: Mar. 19, 1998

[51] Int. Cl.[7] .................................................. H04L 12/50
[52] U.S. Cl. ......................... 370/360; 709/220; 709/223
[58] Field of Search ............................ 370/360; 711/130, 711/118, 122, 121, 151; 710/56, 130; 709/220, 223

[56] References Cited

U.S. PATENT DOCUMENTS

| | | | |
|---|---|---|---|
| 5,249,282 | 9/1993 | Segers | 711/122 |
| 5,832,304 | 11/1998 | Bauman et al. | 711/151 |

OTHER PUBLICATIONS

*MIPS R4000 User's Manual*, MIPS Computer Systems, Inc., Sunnyvale, CA 94088, 1991.

*Primary Examiner*—Michael Horabik
*Assistant Examiner*—Prenell Jones
*Attorney, Agent, or Firm*—Weingarten, Schurgin, Gagnebin & Hayes LLP

[57] ABSTRACT

In a network switch with a distributed address cache, events that update a cache segment are serialized and distributed and acted upon by all the cache segments to maintain consistency among the segments. The segments are individually associated with Input/Output Application Specific Integrated Circuits ("I/O ASICs") interconnected via an event sharing bus used for transmission of cache update messages. Messages are ordered by arbitrating for the shared bus and enforcing that an I/O ASIC does not update its local cache segment until a cache update message is broadcast on the event bus. Each I/O ASIC asserts a busy signal while executing a cache update message to prevent an arbiter from granting the event bus to allow transmission of a subsequent update message; thereby synchronizing all update messages and minimizing storage on each I/O ASIC for update messages. A weakly coherent mechanism predicated on the observation that address learning operations and address aging operations are self correcting is employed which permits cache update messages to be flushed when cache line conflicts are detected.

22 Claims, 6 Drawing Sheets

COHERENCE MECHANISM FOR DISTRIBUTED ADDRESS CACHE IN A NETWORK SWITCH

BACKGROUND OF THE INVENTION

The present invention is generally related to network switches, and more particularly to maintenance of consistency of data in segments of a distributed address cache in a network switch.

Network switches commonly employ an address cache to facilitate the flow of data units in a network. The address cache includes entries that indicate address information for various devices connected with the network such as computers and printers. In particular, the address information indicates which port or ports in the switch should be employed for forwarding the data unit to a particular device or group of devices in the network. Each data unit includes a header portion with a source address field and a destination address field. Following receipt of the data unit the switch attempts to locate an entry in the address cache that pertains to the destination address specified in the data unit header. If a pertinent entry is located in the address cache then the information contained in that entry is employed to cause transmission of the data unit via the specified port or ports associated with the address in order to "forward" the data unit toward the destination device. If a pertinent entry cannot be located in the address cache then the switch may "flood" the data unit by transmitting the data unit from every port except the port on which the data unit was received. Hence, network and switch bandwidth is conserved if a pertinent entry is available in the address cache.

It is known to update the address cache by "learning" new address information. Address information can be learned by employing the source address specified in the data unit header. If a first data unit is transmitted from a first device to a second device via the switch, and the switch does not have the address for the first device in its address cache, then upon the initial transmission from the first device to the second device the switch learns address information for the first device from the source address field of the first data unit. If address information for the second device is also unknown, the switch floods the first data unit in order to accomplish transmission to the second device. If the second device responds by transmitting a second data unit back to the first device via the switch then the switch learns the address of the second device from the source address field of the second data unit. The switch employs the learned address information for the first device to "forward" the second data unit toward the first device via a single port. In a subsequent transmission from the first device to the second device the switch employs the learned address information for the second device to efficiently "forward" the data unit toward the second device via a single port without flooding the data unit through the network.

In an effort to ensure that the address cache contains accurate address information for active data flows, unutilized entries in the address cache may be deleted in accordance with an "aging" technique. In particular, any entries that are not referenced in response to a source address search within a predetermined aging interval are deleted.

Input and output ("I/O") functions in a network switch are often implemented on Application Specific Integrated Circuits ("ASICs"). Because of limitations in the maximum practical die size, a plurality of I/O ASICs may be employed in a single network switch device. Each I/O ASIC must have access to the address cache in order to enable learning, forwarding and aging operations. One technique to provide each I/O ASIC with access to the address cache is to employ a single, centralized address cache. However, the use of a centralized address cache complicates the task of increasing the number of ports in the switch because the memory bandwidth required to support address searching increases as the number of ports increases.

One known solution to the above described problem involves the use of a distributed address cache. The distributed address cache comprises a plurality of separate cache segments, each of which is associated with one particular I/O ASIC. The use of a distributed address cache simplifies the task of increasing the number of ports in the switch because the bandwidth required for address searching is limited by the number of ports supported by each ASIC rather than the number of ports in the entire switch. However, implementing each and every learning, forwarding and aging operation is more complex when a distributed address cache is employed because different events occur simultaneously at different cache segments. Consequently, a situation will result where the segments will not each contain identical sets of entries. Such a loss of intersegment consistency has a deleterious effect on switch operation. Cache coherence algorithms can be applied to eliminate inconsistency among caches and preserve correct switch operation. Strict coherence mechanisms would require elaborate queuing methods and would impact the forwarding performance of the switch.

BRIEF SUMMARY OF THE INVENTION

In accordance with the present invention, in a network switch device in which a distributed address cache having a plurality of cache segments is employed, events initiated at cache segments of the distributed address cache, such as address learning operations, are serialized and contemporaneously shared and acted upon by the cache segments in order to maintain consistency throughout the distributed address cache.

The invention is predicated in part upon recognition that address cache learning operations are self repairing. For example, if address information for forwarding data units is not learned when a data unit is initially transmitted through the switch, the data unit and subsequent data units should nevertheless reach the destination device because flooding will be employed. Further, the address information can be learned from any subsequent data units transmitted by the same source device. Hence, "strict coherency," where each and every learning operation is implemented, is not required for switch operation, and consistency may be obtained with "weak coherency" by which some learning operations may be dropped (not implemented). The invention is also predicated in part upon recognition that address cache aging operations are self correcting. If an address cache entry is not removed after the first aging interval during which it was not referenced, it will be removed in a subsequent interval if it remains unused. Hence, "weak coherence" is also acceptable for aging operations.

Address cache update events (learning operations or aging operations) originate with a single segment of the distributed cache. The segment that initiates an update creates a cache event message and distributes it via an event sharing bus that interconnects all of the I/O ASICs. The event bus carries only one event message at a time; thus serializing event messages. An arbiter is employed to process requests for control of the event bus and to grant control to only one I/O ASIC at a time. When an address cache update event is generated, the event is placed in an event message that is entered in a transmit queue in preparation for distribution via the event sharing bus. After queuing the event message, the I/O ASIC managing the cache segment asserts its request signal to the arbiter. When the arbiter grants control of the event bus, the event message is broadcast to all the ASICs via the event bus. Event messages that are received from the event bus are stored in a receive queue for processing. Once an event message has been received, each of the ASICs, including the originating ASIC, asserts a busy signal to the arbiter and processes the event. The busy signals prevent the arbiter from granting the event bus for another cache event message until all ASICs have completed processing the current event.

If a condition occurs at a distributed cache segment that warrants a cache update, but the transmit queue is full, a cache event message is not generated and the update is not performed. When an I/O ASIC completes processing of an event message from the receive queue, the cache line index of the message in the receive queue is compared against the cache line index of any message in the transmit queue. If a match is indicated, the cache event message in the transmit queue is flushed (deleted). Since the message is deleted before transmission of a cache event message, no cache segments are updated.

In accordance with one embodiment of the present invention the aging of entries in the distributed address cache may be dependent upon an ownership indicator. Each entry in the address cache includes an ownership field that indicates whether the cache segment in which the entry is stored is deemed to be the owner of the entry. The indicator is set such that the ASIC that generates the learn event that causes the entry to be stored in the cache segments is the sole owner of the entry. Only the owner of an entry is permitted to initiate an event that causes removal of the entry for aging. Aging of an entry is therefore determined by the cache segment with ownership rights to the entry.

BRIEF DESCRIPTION OF THE SEVERAL VIEWS OF THE DRAWING

The invention will be more fully understood from the following Detailed Description of the Invention, in conjunction with the Drawing of which.

DETAILED DESCRIPTION OF THE INVENTION

Figure 1:
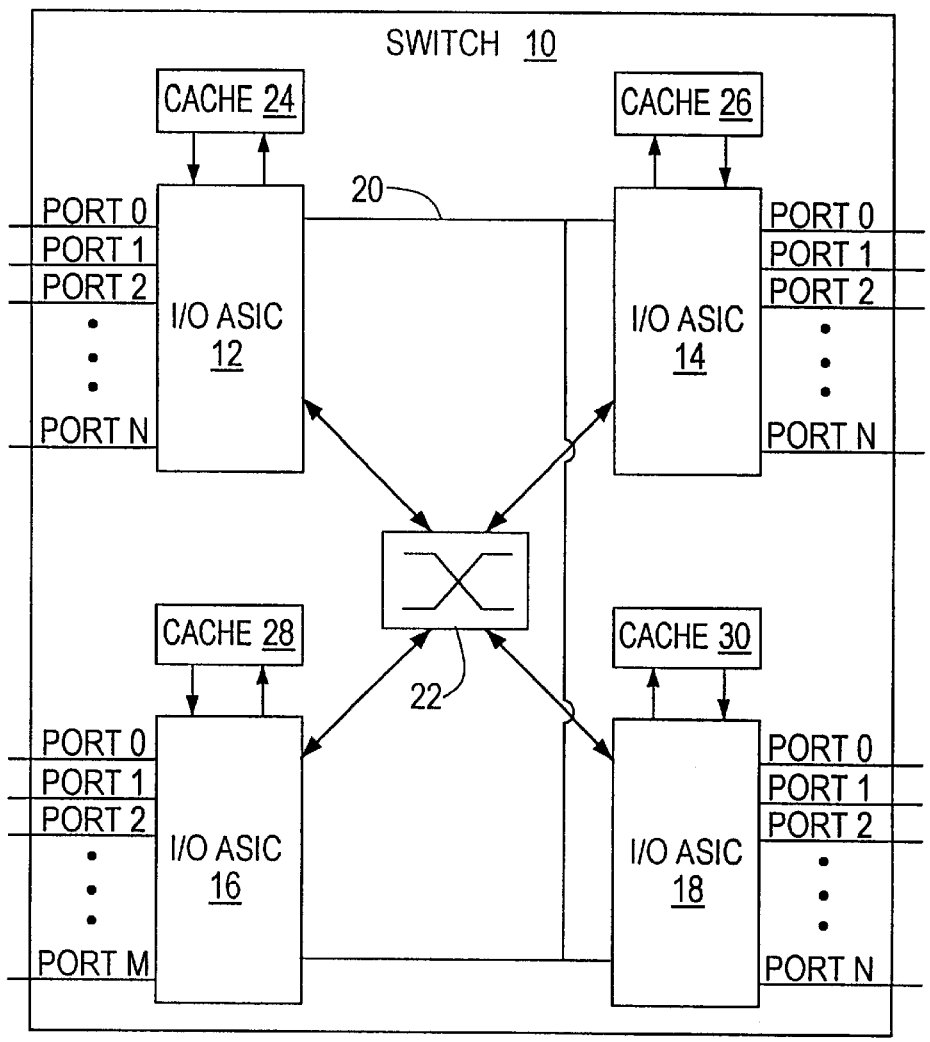
FIG. 1 is a block diagram of a network switching device in accordance with the present invention.

FIG. 1 illustrates a switch 10 that facilitates movement of data units in a network. The switch 10 includes a plurality of Input/Output Application Specific Integrated Circuits ("I/O ASICs") 12, 14, 16, 18 that are interconnected via an event bus 20 and a switch fabric 22 such as a crosspoint ASIC. Each I/O ASIC includes a plurality of ports that are connected with other devices in the network. The ports are employed for receiving and transmitting data units. Different I/O ASICs may include different numbers of ports. For example, in the illustrated embodiment ASIC 18 includes m ports while ASICs 12, 14, 16 include n ports. Further, different I/O ASICs may support different transmission protocols and different data transmission rates. The switch includes a distributed address cache having a plurality of separate cache segments 24, 26, 28, 30, each of which is coupled to a different I/O ASIC. In the illustrated embodiment, cache 24 is connected with I/O ASIC 12, cache 26 is connected with I/O ASIC 14, cache 28 is connected with I/O ASIC 16 and cache 30 is connected with I/O ASIC 18.

Figure 2:
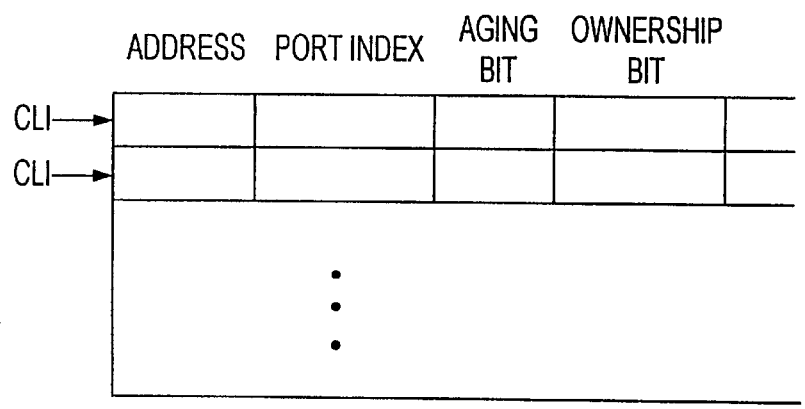
FIG. 2 is a diagram that illustrates a segment of the distributed address cache.

Referring to FIGS. 1 and 2, the address cache 24 is employed to facilitate processing of data units. More particularly, the address cache 24 includes entries that indicate address information that may be employed to transmit data units to various devices coupled to the network such as computers and printers. The address information includes an address indicator field and port index field indexed by a Cache Line Index ("CLI") plus Cache Entry Index ("CEI"). The port index indicates which port or ports in the switch should be employed for forwarding the data unit to a particular device or group of devices. Following receipt of a data unit by I/O ASIC 12, for example, the address cache 24 is searched for an entry with an address indicator field that pertains to the destination address specified in the data unit header. If a pertinent entry is located in the address cache segment 24 then the port index contained in that entry is employed to cause transmission of the data unit via the specified port or ports in order to "forward" the data unit toward the destination device or devices. If a pertinent entry is not located in the address cache segment 24 then the switch 10 may "flood" the data unit by transmitting the data unit through every port in the switch except the port at which the data unit was received.

Referring again to FIG. 1, consistency is maintained between cache segments by synchronizing operations that affect the address information in the cache segments. In particular, distributed address cache update events such as address learning operations are serialized and contemporaneously acted upon in order to maintain consistency throughout the distributed address cache. An address cache update event may be initiated by any I/O ASIC, but the initiating I/O ASIC does not act upon the address cache update event, i.e., update the address cache associated with that I/O ASIC, until an event message is serialized and provided to all of the other I/O ASICs in the switch.

Figure 3:
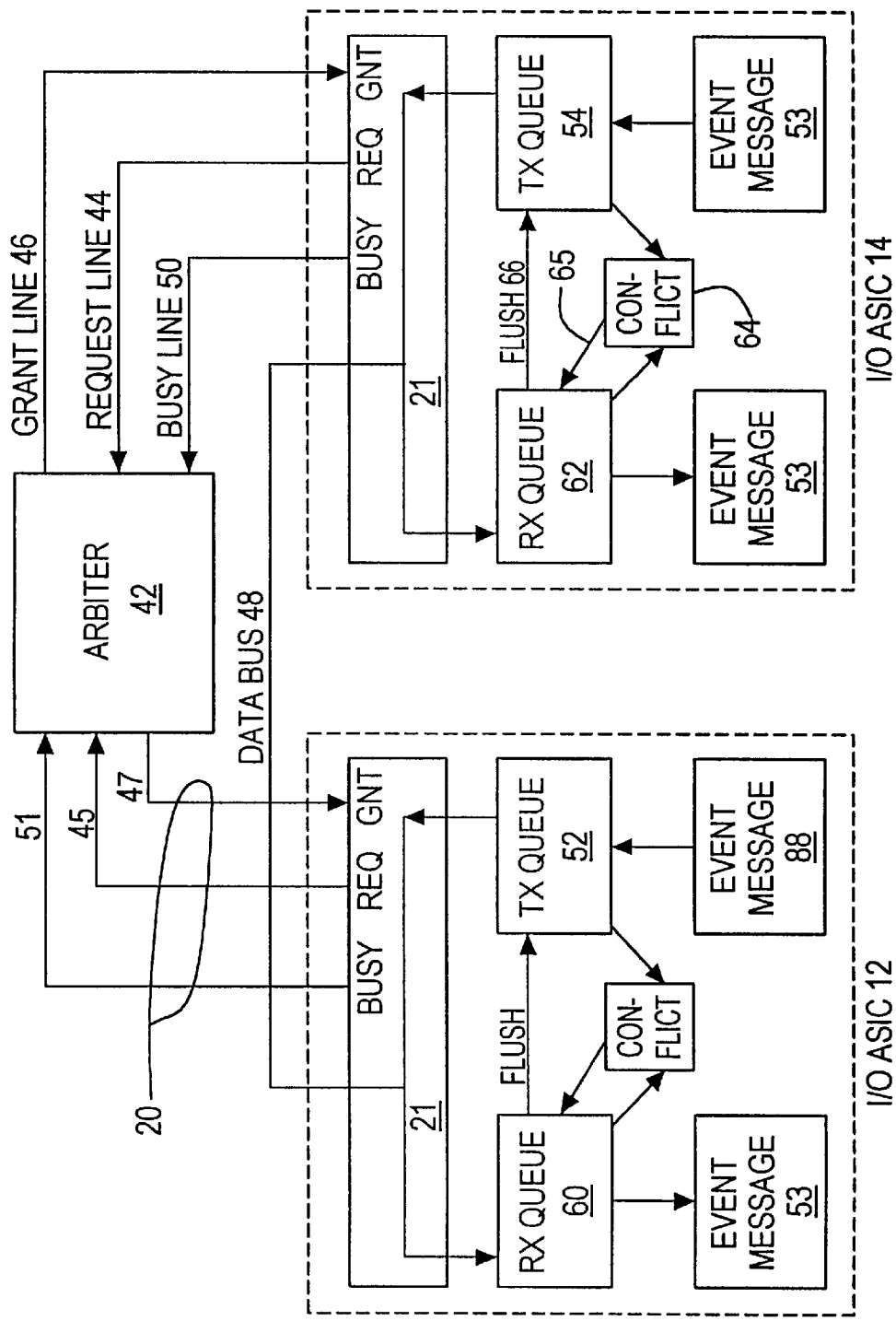
FIG. 3 is a block diagram that illustrates use of the arbiter and event bus for serialization of distributed address cache events.

Referring now to FIG. 3, in the illustrated embodiment address cache event messages are serialized and shared via the event sharing bus 20. The event sharing bus 20 is connected with an interface 21 in each I/O ASIC and an Arbiter device 42. The event bus 20 includes a shared data bus 48 and a control bus per I/O ASIC. As an example, the control bus for I/O ASIC 14 includes request line 44, grant line 46 and busy line 50. The physical limitations of the data bus 48 in the illustrated embodiment limit transmission to one event message at any point in time. Hence, in the illustrated embodiment address cache event messages which are broadcast via the data bus 48 are serialized.

The arbiter device 42 is employed to manage the event sharing bus 20. When an event message is generated as a result of activity at an I/O ASIC, the event message is placed in an event transmit queue. For example, an event message generated at I/O ASIC 12 is placed in event transmit queue 52, and an event message 53 generated at I/O ASIC 14 is placed in event transmit queue 54. In the illustrated embodiment the event transmit queues 52, 54 will not accommodate more than one event message. If the event transmit queue 54 is empty when an event message is generated the event message 53 is loaded into the event transmit queue 54. If the event transmit queue 54 is not empty when a cache update condition occurs then the event message 53 is not loaded into the event transmit queue 54 and is discarded, resulting in no cache update. If the event message 53 is loaded into the event transmit queue 54, the I/O ASIC 14 asserts its event bus request to the arbiter 42 via the request line 44 of the event bus 20. As previously described, the I/O ASIC 14 and associated address cache do not act upon the event message 53 before the event is distributed. The arbiter 42 is operative in response to the request for control of the event sharing bus from I/O ASIC 14 and any other I/O ASICs in the switch to apportion control of the data bus 48. In particular, the arbiter 42 processes the requests and grants control of the data bus 48 to one I/O ASIC at a time in accordance with predetermined criteria. When the arbiter 42 grants control of the data bus 48 to I/O ASIC 14, the event message 53 loaded in the event transmit queue 54 is broadcast on the data bus 48 to each I/O ASIC in the switch. The event message 53 is received in event receive queue 60 of I/O ASIC 12, event receive queue 62 of I/O ASIC 14 and any other event receive queues in the switch. Each I/O ASIC acts upon the event message once the event message has been loaded into the respective receive queue in that I/O ASIC.

While acting upon the event message, such as by updating the address cache, the I/O ASIC asserts its busy signal to delay broadcast of further event messages. In response to assertion of the busy signal by any I/O ASIC the arbiter 42 delays granting control of the data bus 48 to any I/O ASIC. Hence, the start time for processing each new event message at each I/O ASIC is synchronized, thereby compensating for differences in the amount of time taken to process event messages at different I/O ASICs. This permits the receive queue to only implement storage for a single cache update message.

Cache update events are generated with a CLI and CEI which indicate the memory location to update. Since event messages are queued for transmission, the state of the cache line may change between queuing of the event message on the transmit side and execution of the operation on the receive side. Conflict detection and resolution is employed to preserve consistency in the cache segments. The contents of both the event receive queue 62 and the event transmit queue 54 are provided to the conflict detector 64. The conflict detector 64 compares the queued event messages to determine if a conflict exists. A conflict exists when both event messages relate to the same cache line. The conflict detector indicates conflicts to the receive queue via signal line 65. As the last step in processing a message from the receive queue, the conflict line is sampled. If a conflict is indicated, the message in the transmit queue is flushed because it is based on stale cache line state.

Figure 4:
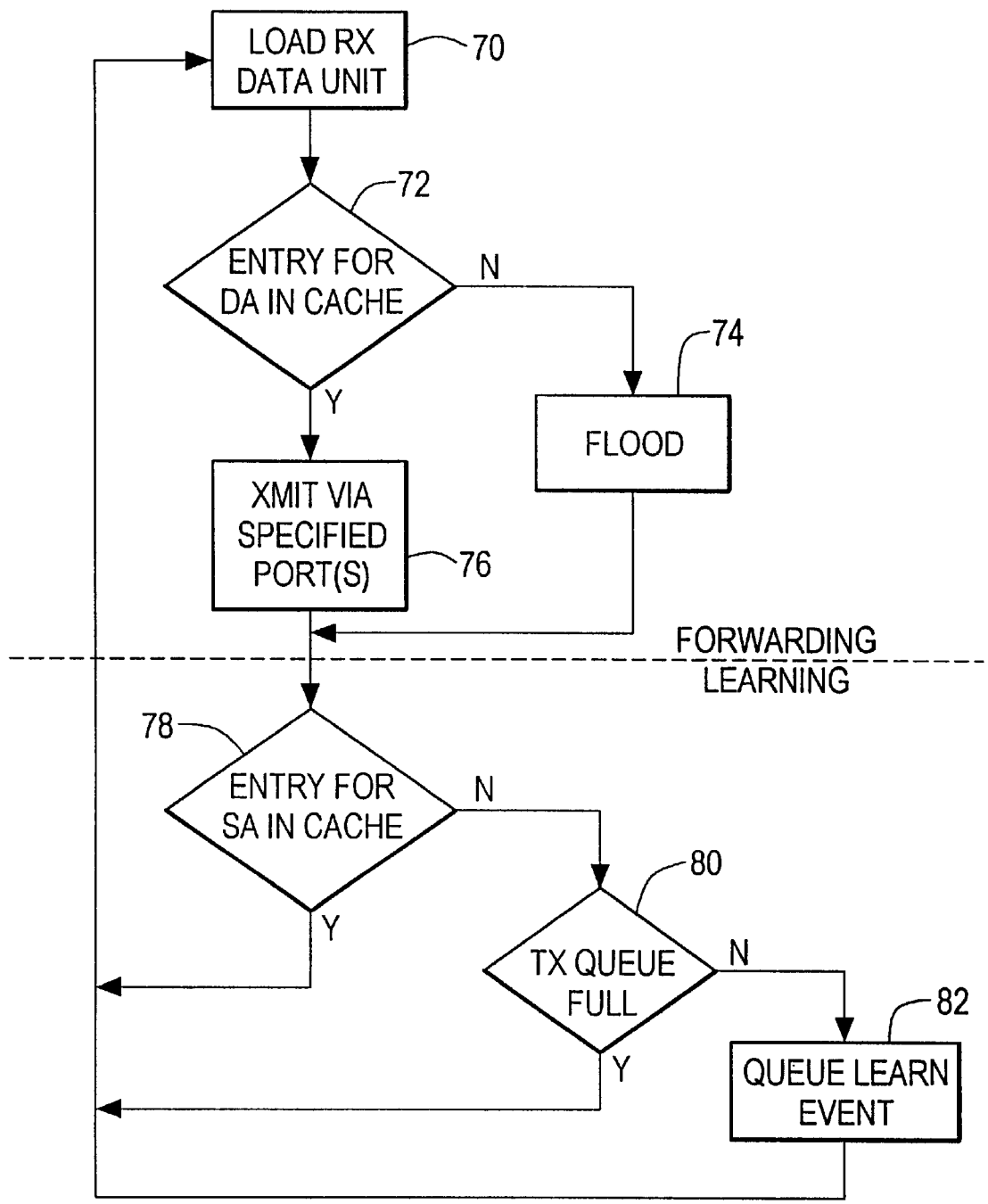
FIG. 4 is a flow diagram that illustrates a method for queuing learn events without impacting forwarding performance of the switch.

A method for carrying out forwarding and learning operations is depicted in FIG. 4. The address cache is employed to identify ports to be used in forwarding a data unit received by an I/O ASIC. Initially, the received data unit is loaded into memory as indicated by step 70. The loaded data unit is examined to determine the specified destination address and the address cache is scanned to determine whether there is a pertinent entry as indicated by step 72. If no pertinent entry is located then the data unit is flooded to some or all of the output ports (other than the receive port) as indicated in step 74. If a pertinent entry is located then the data unit is transmitted via the specified port(s) as indicated by step 76.

Address information is learned by employing the source address specified in the header of the data unit. As indicated by step 78, the loaded data unit is examined to determine the source address and the address cache is scanned to determine whether there is a pertinent entry. If a pertinent address cache entry is located then flow returns to step 70. If no pertinent address cache entry is located and the event transmit queue of the I/O ASIC is full as determined in step 80, flow returns to step 70. If no pertinent address cache entry is located and the event transmit queue of the I/O ASIC is not full as determined in step 80, a learn event message is generated and placed in the event transmit queue as indicated by step 82. Flow then returns to step 70.

Figure 7:
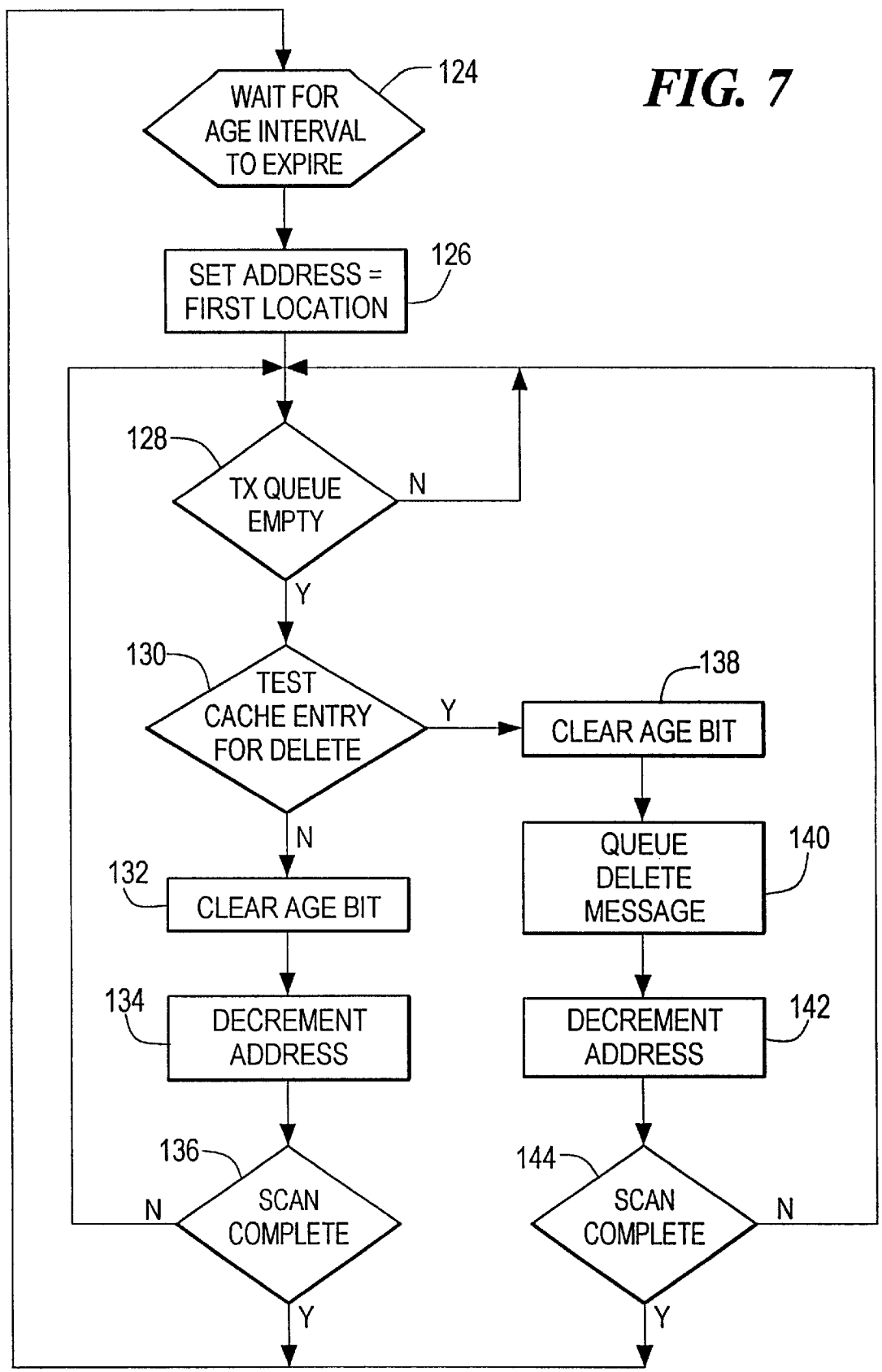
FIG. 7 is a flow diagram that illustrates an age scan process.

Referring to FIGS. 2 and 7, an aging protocol is provided to remove unutilized address cache entries and to help ensure that the address cache contains accurate address information. Each cache entry includes an aging bit and an ownership bit. The ownership bit is only set in the entry in the cache segment that is connected with the I/O ASIC that caused the address cache entry to be installed via a learn operation. For the purposes of the present description, I/O ASIC 12 has ownership of the entry. In the other segment caches the ownership bit is not set. In accordance with this embodiment of the aging protocol, a distributed cache entry can only be deleted via a message from the I/O ASIC with ownership of the entry (or a software generated management operation). When a data unit is received by the I/O ASIC 12 and an entry is located in the address cache segment 24 that matches the source address, the aging bit is set for that entry. After a predetermined interval has passed, the entries for which the aging bit is not set become eligible for deletion and all aging bits are reset. If the event transmit queue 52 is empty, and an entry is eligible for deletion, and the I/O ASIC 12 has ownership of the entry, then the entry is selected and a delete entry event message 88 is loaded into the event transmit queue 52. The delete entry event message 88 is broadcast via the data bus 48 and acted upon by each I/O ASIC when control of the data bus is granted to the I/O ASIC 12. If the event transmit queue is not empty the age scan process stalls and the next address entry is not scanned. When the transmit event queue is emptied, the age scan process continues.

A method for aging address cache entries is illustrated in FIG. 7. The method is initiated when the age interval expires as indicated by step 124. The address is then set to the first location. Flow loops until the transmit queue is empty as indicated by step 128, whereupon the cache entry is tested for a possible delete condition as indicated by step 130. Deletion occurs when age=0 and ownership=1. If the test result is negative, the age bit is cleared as indicated by step 132 and the address is decremented as indicated by step 134. If the scan is complete, as determined at step 136, flow returns to step 124. If the scan is not complete then flow returns to step 128. If the result of the tests at step 130 is affirmative, the age bit is cleared as indicated by step 138. A delete message is then queued as indicated by step 140 and the address is decremented as indicated by step 142. If the scan is complete as determined at step 144, flow returns to step 124. If the scan is not complete as determined at step 144, flow returns to step 128.

Figure 5:
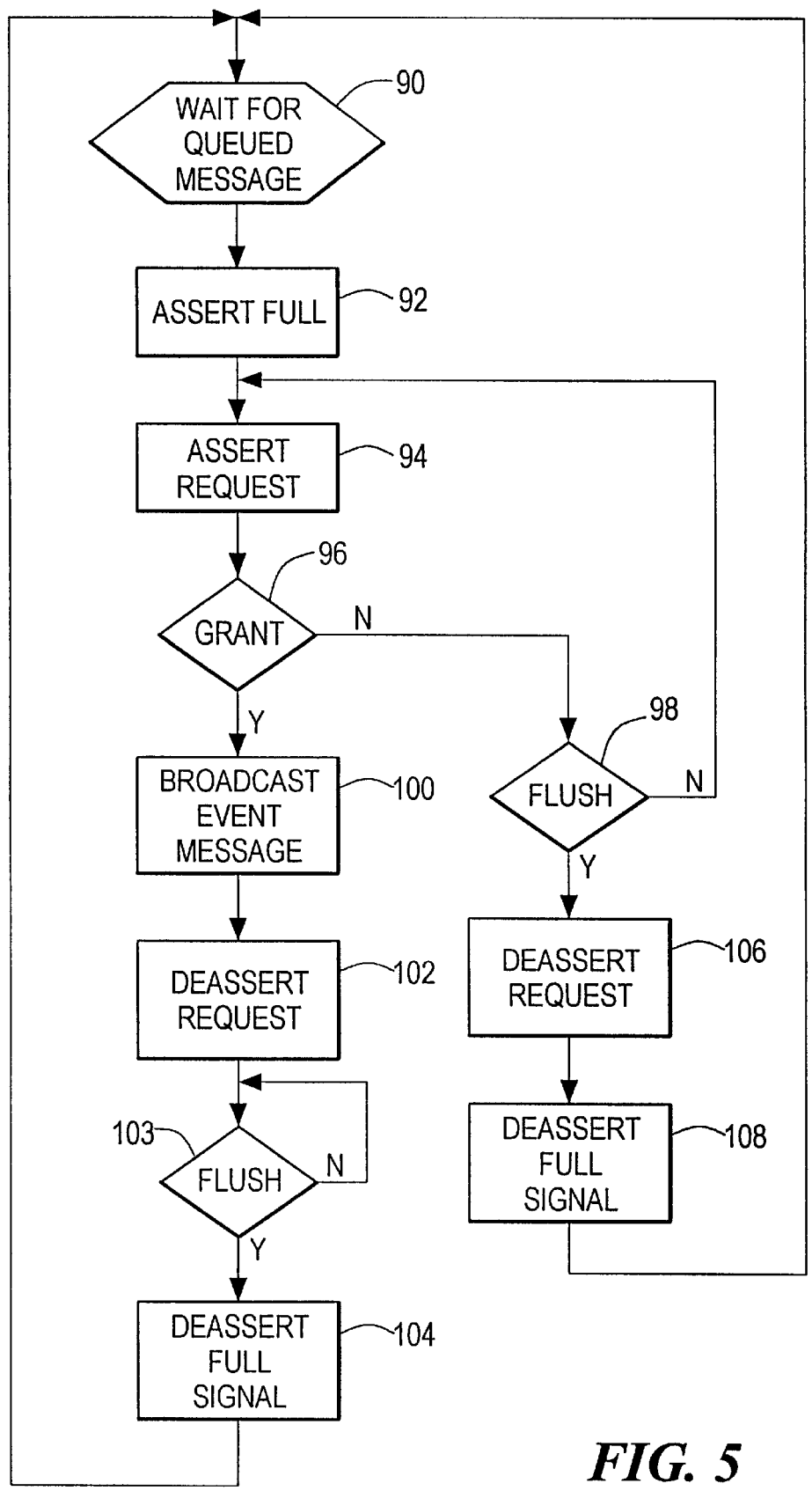
FIG. 5 is a flow diagram that illustrates control of a transmit queue.

A method for controlling the transmit event queue is illustrated in FIG. 5. The process begins when a cache event message is queued for transmission as indicated by step 90.

After receiving an event message the full signal is asserted to prevent further queue events as indicated by step 92. The control flow then loops on asserting the event bus request as indicated by step 94 and waiting for a grant as determined in step 96. If a flush is received while waiting for a grant as determined in step 98, the request is deasserted as indicated by step 106 and the full signal is deasserted as indicated by step 108. Flow returns to waiting for a queued message at step 90. When a grant is received as determined at step 96, the queued message is broadcast as indicated by step 100. The request is then deasserted as indicated by step 102. The transmit control then waits for a flush signal as indicated by step 103. Upon receipt of the flush signal, the full signal is deasserted as indicated by step 104 and flow returns to step 90.

Figure 6:
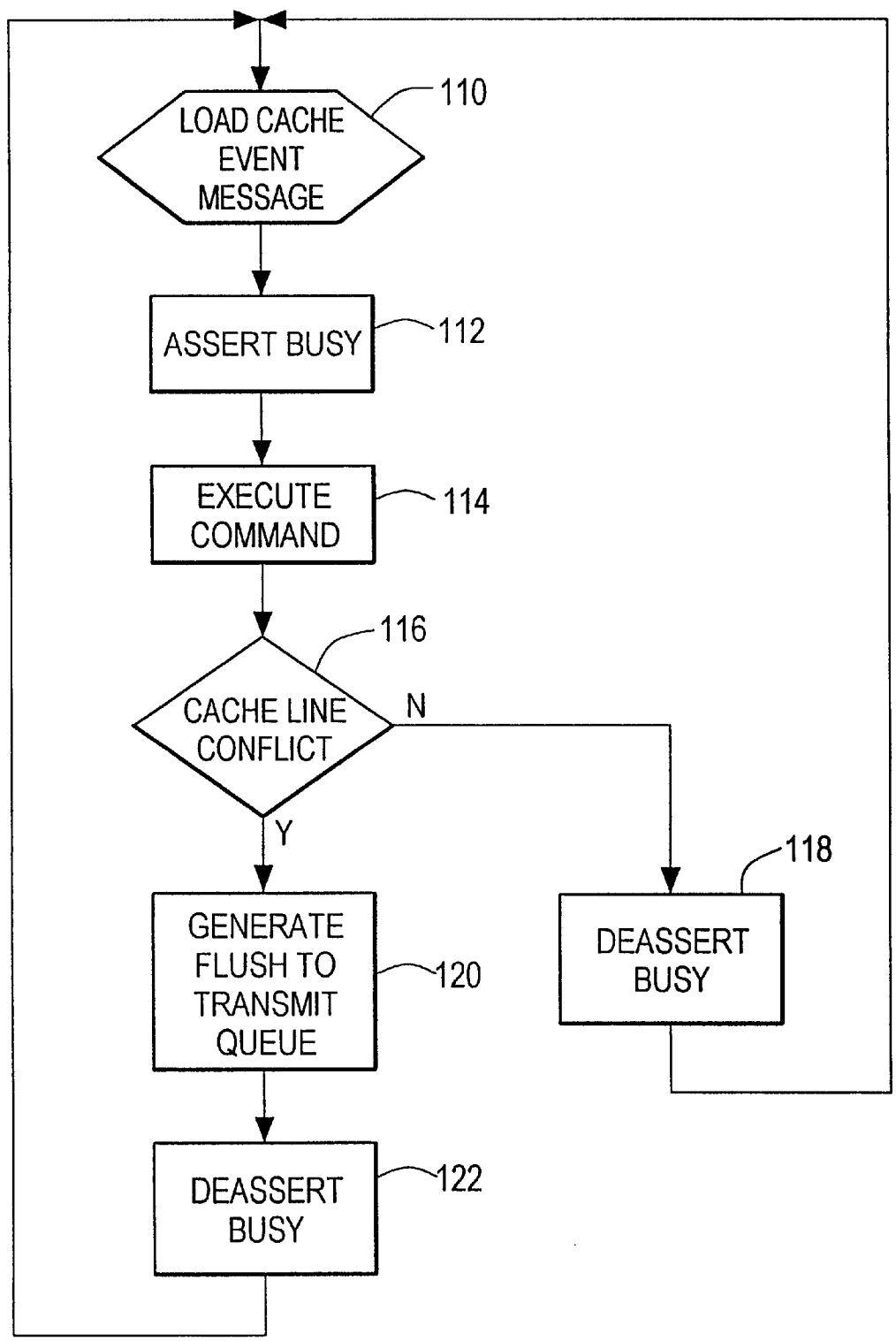
FIG. 6 is a flow diagram that illustrates control of a receive queue.

A method for controlling the receive queue is illustrated in FIG. 6. The process begins when a cache event message is received from the event bus as indicated by step 110. The control logic asserts its busy signal as indicated by step 112 to prevent further messages from being received until the current operation is complete. After the queued message is executed as indicated by step 114, the conflict signal is sampled as indicated by step 116 and a flush is indicated to the transmit queue if required as indicated by step 120. The final step before returning to step 110 is to deassert the busy signal as indicated by steps 118 and 122.

Having described the preferred embodiments of the invention, other embodiments and variations of the invention will be apparent to those skilled in the art. Therefore, the invention should not be viewed as limited to the disclosed embodiments but rather should be viewed as limited only by the spirit and scope of the appended claims.

What is claimed is:

1. Apparatus for updating a distributed address cache in a switch that transmits a data unit from a first device to a second device in a communications network, comprising:
    a first input/output circuit including at least one port operable to receive the data unit, a first cache segment of the distributed address cache operable to store address information, and a first update processor for updating said first address cache segment;
    a second input/output circuit having at least one port, a second cache segment of the distributed address cache operable to store address information, and a second update processor for updating said second address cache segment; and
    a pathway through which data can be transmitted from said first input/output circuit to said second input/output circuit,
    said first update processor circuit being operative to transmit an update message to said second update processor via said pathway prior to updating said first address cache segment, said update message being indicative of changes to be made in the distributed address cache.

2. The apparatus of claim 1 wherein said first address cache segment and said second address cache segment contain substantially identical address information.

3. The apparatus of claim 1 wherein said pathway supports transmission of a single update message at any point in time.

4. The apparatus of claim 3 further including an arbiter for managing control of said pathway by granting control of the pathway to the first input/output circuit in response to a request generated by said first input/output circuit, said arbiter being operative to grant control of said pathway to only one input/output circuit at a time.

5. The apparatus of claim 4 wherein said second input/output circuit asserts a "busy" indicator while processing said update message and said arbiter delays granting control of said pathway in response to assertion of said "busy" indicator.

6. The apparatus of claim 1 wherein said first update processor is operative to facilitate learning a new address from a data unit received via a port of the first input/output circuit by queuing a learn event for transmission via said pathway, and adding an entry for said new address to said first address cache segment once the learn event is transmitted via said pathway.

7. The apparatus of claim 6 wherein said entry includes an ownership indicator that is set to a first state for the address cache segment of the input/output circuit that received the data unit and set to a second state at all other cache segments.

8. The apparatus of claim 7 wherein said entry includes an aging indicator that is set to a first state when said entry is accessed for comparison with a source address.

9. The apparatus of claim 8 further including a scanner that periodically scans the distributed address cache to identify entries where the aging indicator is set to a second state and subsequently resets the aging indicator in each entry to the second state.

10. The apparatus of claim 9 wherein the first input/output circuit is further operative to queue an event for transmission via said pathway that prompts deletion of said entry throughout the distributed address cache if the entry in the first distributed address cache segment is identified by the scanner to have its aging indicator set to a second state and the ownership indicator in the first distributed address cache segment is set to the first state.

11. The apparatus of claim 1 wherein said first and second I/O circuits contain a receive queue, transmit queue and conflict comparitor that detects cache line index matches between said receive and transmit queues.

12. The apparatus of claim 11 wherein said first and second update processors flush update messages stored in the transmit queue when a conflict is detected.

13. A method for updating a distributed address cache in a switch including a first input/output circuit having at least one port and a first cache segment of the distributed address cache, a second input/output circuit having at least one port and a second cache segment of the distributed address cache, and a pathway through which data can be transmitted from said first input/output circuit to said second input/output circuit, comprising the steps of:
    receiving a data unit via at least one port of the first input/output circuit;
    examining the data unit to determine a source address from the data unit;
    searching the first cache segment of the distributed address cache for an entry that is pertinent to the determined source address;
    enqueuing an address learn event message for transmission via said pathway if a pertinent entry is not located in said first cache segment; and
    adding a new entry to the first cache segment once the address learn event is transmitted via said pathway.

14. The method of claim 13 further including the step of adding a new entry to the second cache segment once the address learn event is transmitted via said pathway.

15. The method of claim 13 further including the step of limiting transmission via said pathway to no more than one message at any point in time.

16. The method of claim 15 further including the step of the first input/output circuit requesting control of said pathway when an event message is generated by the first input/output circuit, said request being processed by an arbiter.

17. The method of claim 16 further including the step of the arbiter granting control of the pathway to the first input/output circuit in response to the request generated by said first input/output circuit, said arbiter being operative to grant control of said pathway to only one input/output circuit at a time.

18. The method of claim 17 further including the step of said second input/output circuit asserting a "busy" indicator while processing said event message, and the arbiter delaying granting control of said pathway in response to assertion of said "busy" indicator.

19. The method of claim 13 further including the step of designating ownership of said entry by setting an ownership indicator in said entry to a first state for the address cache segment of the input/output circuit that received the data unit.

20. The method of claim 19 further including the step of setting an aging indicator in the entry to a first state when said entry is employed to forward the data unit to the second device.

21. The method of claim 20 further including the step of periodically scanning the distributed address cache to identify entries where the aging indicator is set to a second state and subsequently resetting the aging indicator in each entry to the second state.

22. The method of claim 21 further including the step of the first input/output circuit queuing an event that prompts deletion of said entry throughout the distributed address cache if the entry in the first address cache segment is identified by the scanner and the ownership indicator in the first address cache segment is set to the first state.

* * * * *